United States Patent
Liu

(10) Patent No.: US 11,576,097 B2
(45) Date of Patent: Feb. 7, 2023

(54) METHOD AND TERMINAL FOR REDIRECTING NETWORK

(71) Applicant: Guangdong OPPO Mobile Telecommunications Corp., Ltd., Guangdong (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/905,051

(22) Filed: Jun. 18, 2020

(65) Prior Publication Data

US 2020/0322858 A1 Oct. 8, 2020

Related U.S. Application Data

(63) Continuation of application No. PCT/CN2017/117030, filed on Dec. 18, 2017.

(51) Int. Cl.
*H04W 36/14* (2009.01)
*H04W 76/30* (2018.01)
*H04W 76/10* (2018.01)

(52) U.S. Cl.
CPC .......... *H04W 36/14* (2013.01); *H04W 76/10* (2018.02); *H04W 76/30* (2018.02)

(58) Field of Classification Search
CPC ......... H04W 36/0033; H04W 36/0022; H04W 88/06; H04W 76/10; H04W 76/30; H04W 36/14; H04W 36/0055; H04W 76/22
See application file for complete search history.

(56) References Cited

U.S. PATENT DOCUMENTS

2013/0083775 A1 4/2013 Sun et al.
2013/0107737 A1* 5/2013 Lee ................ H04W 36/30
370/332

(Continued)

FOREIGN PATENT DOCUMENTS

CN 102308629 A 1/2012
CN 103249101 A 8/2013

(Continued)

OTHER PUBLICATIONS

3GPP TS 23.502 V2.0.0 (Dec. 15, 2017) Technical Specification 3rd Generation Partnership Project;Technical Specification Group Services and System Aspects; Procedures for the 5G System; Stage 2 (Release 15) (Year: 2017).*

(Continued)

*Primary Examiner* — Marcos L Torres
(74) *Attorney, Agent, or Firm* — Bayes PLLC

(57) ABSTRACT

A network redirection method and a terminal are provided. In the embodiments of the present invention, an access network device delivers network switching instruction information used for redirection to a terminal. The network switching instruction information instructs the terminal to obtain a core network type of a target core network of redirection to access a target core network based on the core network type. Network switching between different types of core networks can be implemented without depending on interfaces between the different types of core networks, thereby improving reliability of network switching between different types of core networks.

16 Claims, 6 Drawing Sheets

(56) References Cited

U.S. PATENT DOCUMENTS

2015/0117398 A1  4/2015  Yang et al.
2017/0311245 A1  10/2017 Kuge et al.

FOREIGN PATENT DOCUMENTS

| CN | 103384410 | A | 11/2013 |
|---|---|---|---|
| CN | 103561436 | A | 2/2014 |
| CN | 104302012 | A | 1/2015 |
| CN | 104581856 | A | 4/2015 |
| WO | 2016056321 | A1 | 4/2016 |
| WO | 2016182662 | A1 | 11/2016 |
| WO | 2017079074 | A1 | 5/2017 |

OTHER PUBLICATIONS

Extended European Search Report issued in corresponding European Application No. 17935585.4, dated Dec. 1, 2020, 11 pages.
3rd Generation Partnership Project; Technical Specification Group Services and System Aspects; System Architecture for the 5G System; Stage 2 (Release 15), 3GPP TS 23.501 V2.0.1 (Dec. 2017), 183 pages.
International Patent Application No. PCT/CN2017/117030, International search report, dated Aug. 29, 2018, 12 pages.
Intel Corporation, "Inter-CN change and PDCP version for E-UTRA connected to 5GC", 3GPP TSG-RAN WG2 Meeting #99bis, R2-1710620, Oct. 9-13, 2017.
Intel et al., "Emergency services fallback", SA WG2 Meeting #123, S2-177961, Oct. 23-27, 2017.
OPPO, "Discussion on Intra-Cell Handover with CN Type Change", 3GPP TSG-RAN WG2#100, R2-1713742, Nov. 27-Dec. 1, 2017.
First Office Action issued in corresponding Chinese Application No. 202010382032 8, dated May 20, 2021, 24 pages.
Request for SIPO Patent Priority Review issued in corresponding Chinese Application No. 202010382032.8, dated Apr. 21, 2021, 6 pages.
"Proposals for RRC connection release with redirection for Connected Mobility for IWK", Source: China Mobile, CATR, Huawei, ZTE, CATT, Agenda Item: 6.5.9, SA WG2 Meeting #124, S2-178371, Nov. 27-Dec. 1, 2017, Reno, USA, 5 pages.
3GPP TS 23.502 V2.0.0 Subclause 4.11 System interworking procedures; Subclause 4.13.4.2 Emergency services fallback, Dec. 2017, 253 pages.
The Second Office Action issued in corresponding Chinese Application No. 202010382032.8, dated Jul. 30, 2021, 17 pages.
Notification of Reasons for Refusal issued in corresponding Korean Application No. 10-2020-7020623, dated Aug. 18, 2021, 10 pages.
First Examination Report issued in corresponding India Application No. 202017030260, dated Aug. 17, 2021, 6 pages.
Communication pursuant to Article 94(3) EPC issued in corresponding European Application No. 17935585.4, dated Sep. 9, 2021, 7 pages.
Decision of Rejection issued in corresponding Chinese Application No. 202010382032.8, dated Oct. 18, 2021, 16 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0 (Mar. 2017), 717 pages.
First Office Action issued in corresponding Japanese Application No. 2020-533248, dated Nov. 26, 2021, 8 pages.
Summons to attend oral proceedings pursuant to Rule 115(1) EPC issued in corresponding European Application No. 17935585.4, mailed Feb. 14, 2022, 7 pages.
First Notice of Final Rejection issued in corresponding Korean Application No. 10-2020-7020623, dated Feb. 23, 2022, 10 pages.
Second Notice of Final Rejection issued in corresponding Korean Application No. 10-2020-7020623, dated Apr. 25, 2022, 12 pages.
Reexamination Notice issued in corresponding Chinese Application No. 202010382032.8, dated Apr. 6, 2022, 19 pages.
First Office Action issued in corresponding Taiwanese Application No. 107145510, dated Jun. 9, 2022.
Second Office Action issued in corresponding Japanese Application No. 2020-533248, dated Jul. 19, 2022.
Decision of Reexamniation issued in corresponding Chinese Application No. 202010382032.8, dated Jul. 28, 2022.
Decision of Rejection issued in corresponding European Application No. 17935585.4, dated Oct. 13, 2022.

\* cited by examiner

An access network device sends network switching instruction information that is used for redirection to a terminal, to enable the terminal to obtain a core network type of a target core network of redirection based on the network switching instruction information and access the target core network based on the core network type ⟶ 201

FIG. 2

A mobility management device sends network switching request information that is used for network switching to an access network device, so that the access network device sends network switching instruction information that is used for redirection to a terminal, to enable the terminal to obtain a core network type of a target core network of redirection based on the network switching instruction information and access the target core network based on the core network type  301

FIG. 3

METHOD AND TERMINAL FOR REDIRECTING NETWORK

CROSS-REFERENCES TO RELATED APPLICATIONS

This application is a continuation of and claims priority to International Patent Application PCT/CN2017/117030, filed Dec. 18, 2017, the contents of which is hereby incorporated by reference in its entirety.

BACKGROUND OF THE INVENTION

Technical Field

The present invention relates to wireless communications technologies, and in particular, to a network redirection method, a terminal, an access network device, and a mobility management device.

Related Art

With the rapid development of wireless network communications technologies, wireless communication networks are entering the 5th-generation (5G) era. In the 5G era, a terminal (user equipment, UE) not only can access a 5G core network, that is, a Next Generation Core Network (NGCN), through a Next Generation-Radio Access Network (NG-RAN), but also can access a 4G core network, that is, an Evolved Packet Core Network (EPC), through an Evolved Universal Mobile Telecommunication System Terrestrial Radio Access Network (E-UTRAN). Two types of access network devices may be included in the NG-RAN. One type of access network device is a 5G base station, that is, a gNB, and the other type of access network device is a 4G base station, that is, an eNB. Currently, network switching between the NGCN and the EPC network can be implemented by using an N26 interface between an access and mobility management function (AMF) in the NGCN and a mobility management entity (MME) in the EPC.

However, the network switching between the NGCN and the EPC completely depends on the N26 interface. As a result, in some cases, for example, if there is no N26 interface or the N26 interface fails, the network switching between the NGCN and the EPC cannot be implemented, leading to less reliable network switching between the NGCN and the EPC. The same problem exists in network switching between other different types of core networks.

SUMMARY OF THE INVENTION

According to a plurality of aspects of the present invention, a network redirection method, a terminal, an access network device, and a mobility management device are provided, to implement more reliable network switching between different types of core networks.

According to an aspect of the present invention, a network redirection method is provided, including receiving, by a terminal, network switching instruction information that is used for redirection and that is sent by an access network device. The method further includes obtaining, by the terminal, a core network type of a target core network of redirection based on the network switching instruction information. The method further includes accessing, by the terminal, the target core network based on the core network type.

According to another aspect of the present invention, another network redirection method is provided, including sending, by an access network device, network switching instruction information that is used for redirection to a terminal, to enable the terminal to obtain a core network type of a target core network of redirection based on the network switching instruction information and access the target core network based on the core network type.

According to another aspect of the present invention, another network redirection method is provided, including sending, by a mobility management device, network switching request information that is used for network switching to an access network device, so that the access network device sends network switching instruction information that is used for redirection to a terminal, to enable the terminal to obtain a core network type of a target core network of redirection based on the network switching instruction information and access the target core network based on the core network type.

According to another aspect of the present invention, a terminal is provided, including a receiving unit, configured to receive network switching instruction information that is used for redirection and that is sent by an access network device. The terminal further includes an obtaining unit, configured to obtain a core network type of a target core network of redirection based on the network switching instruction information. The terminal further includes an access unit, configured to access the target core network based on the core network type.

According to another aspect of the present invention, an access network device is provided, including a sending unit, configured to send network switching instruction information that is used for redirection to a terminal, to enable the terminal to obtain a core network type of a target core network of redirection based on the network switching instruction information and access the target core network based on the core network type.

According to another aspect of the present invention, a mobility management device is provided, including a sending unit, configured to send network switching request information that is used for network switching to an access network device, so that the access network device sends network switching instruction information that is used for redirection to a terminal, to enable the terminal to obtain a core network type of a target core network of redirection based on the network switching instruction information and access the target core network based on the core network type.

It may be learned from the foregoing technical solution that in the embodiments of the present invention, an access network device delivers network switching instruction information used for redirection to a terminal, to instruct the terminal to obtain a core network type of a target core network of redirection based on the network switching instruction information and then access the target core network based on the core network type. Network switching between different types of core networks can be implemented without depending on interfaces between the different types of core networks, thereby implementing more reliable network switching between different types of core networks.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 2 is a schematic flowchart of another network redirection method according to another embodiment of the present invention;

FIG. 3 is a schematic flowchart of another network redirection method according to another embodiment of the present invention;

DETAILED DESCRIPTION OF THE INVENTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts fall within the protection scope of the present invention.

In addition, the term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 1:
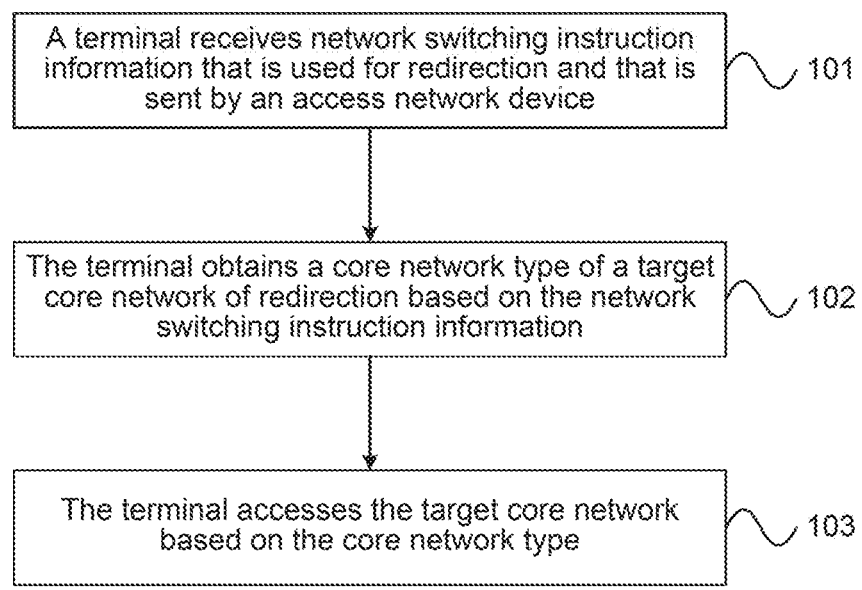
FIG. 1 is a schematic flowchart of a network redirection method according to an embodiment of the present invention.

As shown in FIG. 1, FIG. 1 is a schematic flowchart of a network redirection method according to an embodiment of the present invention.

101. A terminal receives network switching instruction information that is used for redirection and that is sent by an access network device.

102. The terminal obtains a core network type of a target core network of redirection based on the network switching instruction information.

103. The terminal accesses the target core network based on the core network type.

In the core concept of the present invention, an access network device delivers network switching instruction information used for redirection to a terminal, to instruct the terminal to obtain a core network type of a target core network of redirection based on the network switching instruction information and then access the target core network based on the core network type.

In this way, network switching between different types of core networks can be implemented without depending on interfaces between the different types of core networks, thereby implementing more reliable network switching between different types of core networks.

It should be noted that this embodiment is applicable to network switching between different types of core networks, for example, network switching from a 5G core network NGCN to a 4G core network EPC or network switching from a 4G core network EPC to a 5G core network NGCN. Detailed descriptions are provided below with reference to different implementations.

In this embodiment, the network switching instruction information that is used for redirection and that is received by the terminal may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

Optionally, in a possible implementation of this embodiment, before 101, the access network device may further receive network switching request information that is used for network switching and that is sent by a mobility management device.

The network switching request information may be specifically network switching request information that is used for voice fallback of a voice service or an emergency service.

Specifically, the network switching request information that is used for network switching and that is received by the access network device may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In a specific implementation, UE is currently connected to a 5G core network NGCN. In this case, an access network device, that is, an eNB or a gNB, connected to the NGCN may receive an N2 request message sent by an AMF. The N2 request message carries the network switching request information.

In another specific implementation, UE is currently connected to a 4G core network EPC. In this case, an access network device, that is, an eNB, connected to the EPC may receive a UE context modification request message sent by an MME. The UE context modification request message carries the network switching request information.

Optionally, in a possible implementation of this embodiment, in 101, the terminal may specifically receive a radio resource control (RRC) connection release message sent by the access network device, where the RRC connection release message carries the network switching instruction information.

Specifically, the network switching instruction information may be carried by an existing information element (IE), for example, a release cause IE, in the RRC connection release message. Alternatively, the network switching instruction information may be carried by a newly added IE in the RRC connection release message. This is not particularly limited in this embodiment.

Optionally, in a possible implementation of this embodiment, in 102, the terminal may specifically obtain the core network type of the target core network of redirection based on the network switching instruction information.

In a specific implementation, if the network switching instruction information is a network switching instruction used to instruct whether to switch a network, the terminal may obtain the core network type of the target core network of redirection based on the network switching instruction.

For example, it is assumed that the core network to which the terminal is currently connected is a 5G core network NGCN. If the network switching instruction received by the terminal instructs to switch a core network, the terminal may obtain that the core network type of the target core network of redirection is a 4G core network EPC. If the network switching instruction received by the terminal instructs not to switch a core network, the terminal may obtain that the core network type of the target core network of redirection is still the 5G core network NGCN.

Alternatively, for example, it is assumed that the core network to which the terminal is currently connected is a 4G core network EPC. If the network switching instruction received by the terminal instructs to switch a core network, the terminal may obtain that the core network type of the target core network of redirection is a 5G core network NGCN. If the network switching instruction received by the terminal instructs not to switch a core network, the terminal may obtain that the core network type of the target core network of redirection is still the 4G core network EPC.

In another specific implementation, if the network switching instruction information is a target core network identifier used to indicate the core network type of the target core network of redirection, the terminal may obtain the core network type of the target core network of redirection based on the target core network identifier.

For example, it is assumed that the core network to which the terminal is currently connected is a 5G core network NGCN. If the core network type of the target core network of redirection that is indicated by the target core network identifier received by the terminal is a 4G core network EPC, the terminal may obtain that the core network type of the target core network of redirection is the 4G core network EPC. If the core network type of the target core network of redirection that is indicated by the target core network identifier received by the terminal is the 5G core network NGCN, the terminal may obtain that the core network type of the target core network of redirection is still the 5G core network NGCN.

Alternatively, for example, it is assumed that the core network to which the terminal is currently connected is a 4G core network EPC. If the core network type of the target core network of redirection that is indicated by the target core network identifier received by the terminal is a 5G core network NGCN, the terminal may obtain that the core network type of the target core network of redirection is a 5G core network NGCN. If the core network type of the target core network of redirection that is indicated by the target core network identifier received by the terminal is the 4G core network EPC, the terminal may obtain that the core network type of the target core network of redirection is still the 4G core network EPC.

Optionally, in a possible implementation of this embodiment, in 103, the terminal may specifically send core network type indication information used to indicate the core network type of the target core network to a target access network device of redirection, to enable the terminal to access the target core network through the target access network device.

It should be noted that the target access network device of redirection may be determined and selected by using an existing technical solution and indicated to the terminal. This is not particularly limited in this embodiment.

Specifically, the terminal may send an RRC connection request message to the target access network device. The RRC connection request message carries the core network type indication information.

In this embodiment, the core network type indication information may be a core network type indication, or may be a non-access stratum (NAS) capability of a 5G core network. This is not particularly limited in this embodiment.

The core network type indication is used to indicate the core network type of the target core network of redirection and may be specifically included in Message 5 or Message 3. For example, one bit may be used as the core network type indication. 1 represents a 5G core network NGCN, and 0 represents a 4G core network EPC. Alternatively, 0 represents a 5G core network NGCN, and 1 represents a 4G core network EPC.

The NAS capability is used to indicate the core network type of the target core network of redirection. For example, if the NAS capability is carried, a 5G core network NGCN is represented. If the NAS capability is not carried, the core network type is represented by default, and a 4G core network EPC is represented.

After the target access network device receives the core network type indication information, the target access network device may perform a core network access procedure of accessing the target core network of redirection indicated by the core network type indication information.

For example, if the core network type of the target core network of redirection that is indicated by the core network type indication information received by the target access network device is a 4G core network EPC, the target access network device may perform a core network access procedure of accessing the 4G core network EPC.

Alternatively, for example, if the core network type of the target core network of redirection that is indicated by the core network type indication information received by the target access network device is a 5G core network NGCN, the target access network device may perform a core network access procedure of accessing the 5G core network NGCN.

In this embodiment, an access network device delivers network switching instruction information used for redirection to a terminal, to instruct the terminal to obtain a core network type of a target core network of redirection based on the network switching instruction information and then access the target core network based on the core network type. Network switching between different types of core networks can be implemented without depending on interfaces between the different types of core networks, thereby implementing more reliable network switching between different types of core networks.

As shown in FIG. 2, FIG. 2 is a schematic flowchart of another network redirection method according to another embodiment of the present invention.

201. An access network device sends network switching instruction information that is used for redirection to a terminal, to enable the terminal to obtain a core network type of a target core network of redirection based on the network switching instruction information and access the target core network based on the core network type.

In the core concept of the present invention, an access network device delivers network switching instruction information used for redirection to a terminal, to instruct the terminal to obtain a core network type of a target core network of redirection based on the network switching instruction information and then access the target core network based on the core network type.

In this way, network switching between different types of core networks can be implemented without depending on interfaces between the different types of core networks, thereby implementing more reliable network switching between different types of core networks.

It should be noted that this embodiment is applicable to network switching between different types of core networks, for example, network switching from a 5G core network NGCN to a 4G core network EPC or network switching from a 4G core network EPC to a 5G core network NGCN. Detailed descriptions are provided below with reference to different implementations.

In this embodiment, the network switching instruction information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

Optionally, in a possible implementation of this embodiment, before 201, the access network device may further receive network switching request information that is used for network switching and that is sent by a mobility management device.

The network switching request information may be specifically network switching request information that is used for voice fallback of a voice service or an emergency service.

Specifically, the network switching request information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In a specific implementation, UE is currently connected to a 5G core network NGCN. In this case, an access network device, that is, an eNB or a gNB, connected to the NGCN may receive an N2 request message sent by an AMF. The N2 request message carries the network switching request information.

In another specific implementation, UE is currently connected to a 4G core network EPC. In this case, an access network device, that is, an eNB, connected to the EPC may receive a UE context modification request message sent by an MME. The UE context modification request message carries the network switching request information.

Optionally, in a possible implementation of this embodiment, in 201, the access network device may specifically send an RRC connection release message to the terminal. The RRC connection release message carries the network switching instruction information.

Specifically, the network switching instruction information may be carried by an existing IE, for example, a release cause IE, in the RRC connection release message. Alternatively, the network switching instruction information may be carried by a newly added IE in the RRC connection release message. This is not particularly limited in this embodiment.

In this embodiment, after receiving the network switching instruction information sent by the access network device, the terminal may obtain the core network type of the target core network of redirection based on the network switching instruction information.

In a specific implementation, if the network switching instruction information is a network switching instruction, the terminal may obtain the core network type of the target core network of redirection based on the network switching instruction.

For example, it is assumed that the core network to which the terminal is currently connected is a 5G core network NGCN. If the network switching instruction received by the terminal instructs to switch a core network, the terminal may obtain that the core network type of the target core network of redirection is a 4G core network EPC. If the network switching instruction received by the terminal instructs not to switch a core network, the terminal may obtain that the core network type of the target core network of redirection is still the 5G core network NGCN.

Alternatively, for example, it is assumed that the core network to which the terminal is currently connected is a 4G core network EPC. If the network switching instruction received by the terminal instructs to switch a core network, the terminal may obtain that the core network type of the target core network of redirection is a 5G core network NGCN. If the network switching instruction received by the terminal instructs not to switch a core network, the terminal may obtain that the core network type of the target core network of redirection is still the 4G core network EPC.

In another specific implementation, if the network switching instruction information is a target core network identifier used to indicate the core network type of the target core network of redirection, the terminal may obtain the core network type of the target core network of redirection based on the target core network identifier.

For example, it is assumed that the core network to which the terminal is currently connected is a 5G core network NGCN. If the core network type of the target core network of redirection that is indicated by the target core network identifier received by the terminal is a 4G core network EPC, the terminal may obtain that the core network type of the target core network of redirection is the 4G core network EPC. If the core network type of the target core network of redirection that is indicated by the target core network identifier received by the terminal is the 5G core network NGCN, the terminal may obtain that the core network type of the target core network of redirection is still the 5G core network NGCN.

Alternatively, for example, it is assumed that the core network to which the terminal is currently connected is a 4G core network EPC. If the core network type of the target core network of redirection that is indicated by the target core network identifier received by the terminal is a 5G core network NGCN, the terminal may obtain that the core network type of the target core network of redirection is a 5G core network NGCN. If the core network type of the target core network of redirection that is indicated by the target core network identifier received by the terminal is the 4G core network EPC, the terminal may obtain that the core network type of the target core network of redirection is still the 4G core network EPC.

It may be understood that, if the network switching instruction information is the target core network identifier, the target core network identifier may be indicated by default by carrying no identifier, to indicate the currently accessed core network.

In this embodiment, after obtaining the core network type of the target core network of redirection, the terminal may access the target core network. Specifically, core network type indication information used to indicate the core network type of the target core network may be sent to a target access network device of redirection, to enable the terminal to access the target core network through the target access network device.

It should be noted that the target access network device of redirection may be determined and selected by using an existing technical solution and indicated to the terminal. This is not particularly limited in this embodiment.

Specifically, the terminal may send an RRC connection request message to the target access network device. The RRC connection request message carries the core network type indication information.

In this embodiment, the core network type indication information may be a core network type indication, or may be a NAS capability of a 5G core network. This is not particularly limited in this embodiment.

The core network type indication is used to indicate the core network type of the target core network of redirection and may be specifically included in Message 5 or Message 3. For example, one bit may be used as the core network type indication. 1 represents a 5G core network NGCN, and 0 represents a 4G core network EPC. Alternatively, 0 represents a 5G core network NGCN, and 1 represents a 4G core network EPC.

The NAS capability is used to indicate the core network type of the target core network of redirection. For example, if the NAS capability is carried, a 5G core network NGCN is represented. If the NAS capability is not carried, the core network type is represented by default, and a 4G core network EPC is represented.

After the target access network device receives the core network type indication information, the target access network device may perform a core network access procedure of accessing the target core network of redirection indicated by the core network type indication information.

For example, if the core network type of the target core network of redirection that is indicated by the core network type indication information received by the target access network device is a 4G core network EPC, the target access network device may perform a core network access procedure of accessing the 4G core network EPC.

Alternatively, for example, if the core network type of the target core network of redirection that is indicated by the core network type indication information received by the target access network device is a 5G core network NGCN, the target access network device may perform a core network access procedure of accessing the 5G core network NGCN.

In this embodiment, an access network device delivers network switching instruction information used for redirection to a terminal, to instruct the terminal to obtain a core network type of a target core network of redirection based on the network switching instruction information and then access the target core network based on the core network type. Network switching between different types of core networks can be implemented without depending on interfaces between the different types of core networks, thereby implementing more reliable network switching between different types of core networks.

As shown in FIG. 3, FIG. 3 is a schematic flowchart of another network redirection method according to another embodiment of the present invention.

301. A mobility management device sends network switching request information that is used for network switching to an access network device, so that the access network device sends network switching instruction information that is used for redirection to a terminal, to enable the terminal to obtain a core network type of a target core network of redirection based on the network switching instruction information and access the target core network based on the core network type.

In the core concept of the present invention, an access network device delivers network switching instruction information used for redirection to a terminal, to instruct the terminal to obtain a core network type of a target core network of redirection based on the network switching instruction information and then access the target core network based on the core network type.

In this way, network switching between different types of core networks can be implemented without depending on interfaces between the different types of core networks, thereby implementing more reliable network switching between different types of core networks.

It should be noted that this embodiment is applicable to network switching between different types of core networks, for example, network switching from a 5G core network NGCN to a 4G core network EPC or network switching from a 4G core network EPC to a 5G core network NGCN. Detailed descriptions are provided below with reference to different implementations.

In this embodiment, the network switching instruction information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

Optionally, in a possible implementation of this embodiment, in 301, the mobility management device may specifically use an existing message to send the network switching request information that is used for network switching to the access network device.

The network switching request information may be specifically network switching request information that is used for voice fallback of a voice service or an emergency service.

Specifically, the network switching request information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In a specific implementation, UE is currently connected to a 5G core network NGCN. In this case, an AMF may send an N2 request message to an access network device, that is, an eNB or a gNB, connected to the NGCN. The N2 request message carries the network switching request information.

In another specific implementation, UE is currently connected to a 4G core network EPC. In this case, an MME may send a UE context modification request message to an access network device, that is, an eNB, connected to the EPC. The UE context modification request message carries the network switching request information.

In this embodiment, after the access network device receives the network switching request information sent by the mobility management device, the network switching instruction information used for redirection may be sent to the terminal, to enable the terminal to obtain the core network type of the target core network of redirection based on the network switching instruction information and access the target core network based on the core network type.

Specifically, the access network device may send an RRC connection release message to the terminal. The RRC connection release message carries the network switching instruction information.

Specifically, the network switching instruction information may be carried by an existing IE, for example, a release cause IE, in the RRC connection release message. Alternatively, the network switching instruction information may be carried by a newly added IE in the RRC connection release message. This is not particularly limited in this embodiment.

In this embodiment, after receiving the network switching instruction information sent by the access network device, the terminal may obtain the core network type of the target core network of redirection based on the network switching instruction information.

In a specific implementation, if the network switching instruction information is a network switching instruction, the terminal may obtain the core network type of the target core network of redirection based on the network switching instruction.

For example, it is assumed that the core network to which the terminal is currently connected is a 5G core network NGCN. If the network switching instruction received by the terminal instructs to switch a core network, the terminal may obtain that the core network type of the target core network of redirection is a 4G core network EPC. If the network switching instruction received by the terminal instructs not to switch a core network, the terminal may obtain that the core network type of the target core network of redirection is still the 5G core network NGCN.

Alternatively, for example, it is assumed that the core network to which the terminal is currently connected is a 4G core network EPC. If the network switching instruction received by the terminal instructs to switch a core network, the terminal may obtain that the core network type of the target core network of redirection is a 5G core network NGCN. If the network switching instruction received by the terminal instructs not to switch a core network, the terminal may obtain that the core network type of the target core network of redirection is still the 4G core network EPC.

In another specific implementation, if the network switching instruction information is a target core network identifier used to indicate the core network type of the target core network of redirection, the terminal may obtain the core network type of the target core network of redirection based on the target core network identifier.

For example, it is assumed that the core network to which the terminal is currently connected is a 5G core network NGCN. If the core network type of the target core network of redirection that is indicated by the target core network identifier received by the terminal is a 4G core network EPC, the terminal may obtain that the core network type of the target core network of redirection is the 4G core network EPC. If the core network type of the target core network of redirection that is indicated by the target core network identifier received by the terminal is the 5G core network NGCN, the terminal may obtain that the core network type of the target core network of redirection is still the 5G core network NGCN.

Alternatively, for example, it is assumed that the core network to which the terminal is currently connected is a 4G core network EPC. If the core network type of the target core network of redirection that is indicated by the target core network identifier received by the terminal is a 5G core network NGCN, the terminal may obtain that the core network type of the target core network of redirection is a 5G core network NGCN. If the core network type of the target core network of redirection that is indicated by the target core network identifier received by the terminal is the 4G core network EPC, the terminal may obtain that the core network type of the target core network of redirection is still the 4G core network EPC.

It may be understood that, if the network switching instruction information is the target core network identifier, the target core network identifier may be indicated by default by carrying no identifier, to indicate the currently accessed core network.

In this embodiment, after obtaining the core network type of the target core network of redirection, the terminal may access the target core network. Specifically, core network type indication information used to indicate the core network type of the target core network may be sent to a target access network device of redirection, to enable the terminal to access the target core network through the target access network device.

It should be noted that the target access network device of redirection may be determined and selected by using an existing technical solution and indicated to the terminal. This is not particularly limited in this embodiment.

Specifically, the terminal may send an RRC connection request message to the target access network device. The RRC connection request message carries the core network type indication information.

In this embodiment, the core network type indication information may be a core network type indication, or may be a NAS capability of a 5G core network. This is not particularly limited in this embodiment.

The core network type indication is used to indicate the core network type of the target core network of redirection and may be specifically included in Message 5 or Message 3. For example, one bit may be used as the core network type indication. 1 represents a 5G core network NGCN, and 0 represents a 4G core network EPC. Alternatively, 0 represents a 5G core network NGCN, and 1 represents a 4G core network EPC.

The NAS capability is used to indicate the core network type of the target core network of redirection. For example, if the NAS capability is carried, a 5G core network NGCN is represented. If the NAS capability is not carried, the core network type is represented by default, and a 4G core network EPC is represented.

After the target access network device receives the core network type indication information, the target access network device may perform a core network access procedure of accessing the target core network of redirection indicated by the core network type indication information.

For example, if the core network type of the target core network of redirection that is indicated by the core network type indication information received by the target access network device is a 4G core network EPC, the target access network device may perform a core network access procedure of accessing the 4G core network EPC.

Alternatively, for example, if the core network type of the target core network of redirection that is indicated by the core network type indication information received by the target access network device is a 5G core network NGCN, the target access network device may perform a core network access procedure of accessing the 5G core network NGCN.

In this embodiment, an access network device delivers network switching instruction information used for redirection to a terminal, to instruct the terminal to obtain a core network type of a target core network of redirection based on the network switching instruction information and then access the target core network based on the core network type. Network switching between different types of core networks can be implemented without depending on interfaces between the different types of core networks, thereby implementing more reliable network switching between different types of core networks.

It should be noted that the foregoing method embodiments are illustrated as a series of action combinations for ease of description; however, a person skilled in the art should know that the present invention is not limited to the described order of actions, because based on the present invention, some steps may be performed in another order or at the same time. Next, a person skilled in the art should know that the embodiments described in the specification are all preferred embodiments, and the involved actions and modules are not necessarily required in the present invention.

In the foregoing embodiments, the descriptions of the embodiments place different emphasis on different content, and for a part that is not detailed in an embodiment, reference can be made to the relevant descriptions of other embodiments.

Figure 4:
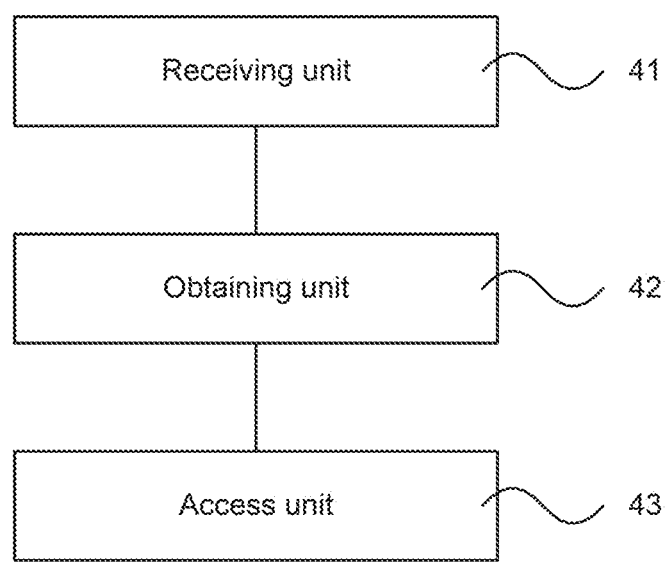
FIG. 4 is a schematic structural diagram of a terminal according to another embodiment of the present invention.

As shown in FIG. 4, FIG. 4 is a schematic structural diagram of a terminal according to another embodiment of the present invention. In this embodiment, the terminal may include a receiving unit 41, an obtaining unit 42, and an access unit 43. The receiving unit 41 is configured to receive network switching instruction information that is used for redirection and that is sent by an access network device. The obtaining unit 42 is configured to obtain a core network type of a target core network of redirection based on the network switching instruction information. The access unit 43 is configured to access the target core network based on the core network type.

Optionally, in a possible implementation of this embodiment, the receiving unit 41 may be specifically configured to receive an RRC connection release message sent by the access network device, where the RRC connection release message carries the network switching instruction information.

Optionally, in a possible implementation of this embodiment, the access unit 43 may be specifically configured to send core network type indication information used to indicate the core network type of the target core network to a target access network device of redirection, to enable the terminal to access the target core network through the target access network device.

Specifically, the access unit 43 may be configured to send an RRC connection request message to the target access network device, where the RRC connection request message carries the core network type indication information.

In this embodiment, the network switching instruction information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In this embodiment, the core network type indication information may be a core network type indication, or may be a NAS capability of a 5G core network. This is not particularly limited in this embodiment.

The core network type indication is used to indicate the core network type of the target core network of redirection and may be specifically included in Message 5 or Message 3. For example, one bit may be used as the core network type indication. 1 represents a 5G core network NGCN, and 0 represents a 4G core network EPC. Alternatively, 0 represents a 5G core network NGCN, and 1 represents a 4G core network EPC.

The NAS capability is used to indicate the core network type of the target core network of redirection. For example, if the NAS capability is carried, a 5G core network NGCN is represented. If the NAS capability is not carried, the core network type is represented by default, and a 4G core network EPC is represented.

It should be noted that the functions of the terminal in the embodiment corresponding to FIG. 1 may be implemented by the terminal provided in this embodiment. For detailed descriptions, refer to related content in the embodiment corresponding to FIG. 1. Details are not described herein again.

Figure 5A:
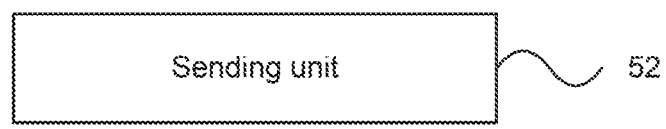
FIG. 5A is a schematic structural diagram of an access network device according to another embodiment of the present invention.

As shown in FIG. 5A, FIG. 5A is a schematic structural diagram of an access network device according to another embodiment of the present invention. In this embodiment, the access network device may include a sending unit 52. The sending unit 52 is configured to send network switching instruction information that is used for redirection to a terminal, to enable the terminal to obtain a core network type of a target core network of redirection based on the network switching instruction information and access the target core network based on the core network type.

Figure 5B:
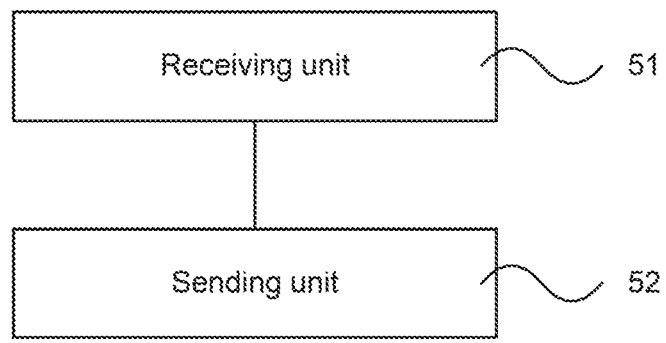
FIG. 5B is a schematic structural diagram of an access network device according to another embodiment of the present invention.

Optionally, in a possible implementation of this embodiment, as shown in FIG. 5B, the access network device provided in this embodiment may further include a receiving unit 51, configured to receive network switching request information that is used for network switching and that is sent by a mobility management device.

The network switching request information may be specifically network switching request information that is used for voice fallback of a voice service or an emergency service.

In an implementation, the receiving unit 51 may be specifically configured to receive an N2 request message or a UE context modification request message sent by the mobility management device, where the N2 request message or the UE context modification request message carries the network switching request information.

Optionally, in a possible implementation of this embodiment, the sending unit 52 may be specifically configured to send an RRC connection release message to the terminal, where the RRC connection release message carries the network switching instruction information.

In this embodiment, the network switching instruction information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In this embodiment, the network switching request information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

It should be noted that the functions of the access network device in the embodiment corresponding to FIG. 2 may be implemented by the access network device provided in this embodiment. For detailed descriptions, refer to related content in the embodiment corresponding to FIG. 2. Details are not described herein again.

Figure 6:
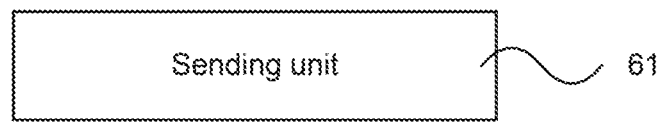
FIG. 6 is a schematic structural diagram of a mobility management device according to another embodiment of the present invention.

As shown in FIG. 6, FIG. 6 is a schematic structural diagram of a mobility management device according to another embodiment of the present invention. In this embodiment, the mobility management device may include a sending unit 61, configured to send network switching request information that is used for network switching to an access network device, so that the access network device sends network switching instruction information that is used for redirection to a terminal, to enable the terminal to obtain a core network type of a target core network of redirection based on the network switching instruction information and access the target core network based on the core network type.

The network switching request information may be specifically network switching request information that is used for voice fallback of a voice service or an emergency service.

Optionally, in a possible implementation of this embodiment, the sending unit 61 may be specifically configured to send an N2 request message or a UE context modification request message to the access network device, where the N2 request message or the UE context modification request message carries the network switching request information.

In this embodiment, the network switching instruction information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

In this embodiment, the network switching request information may be a network switching instruction or may be a target core network identifier. This is not particularly limited in this embodiment.

The network switching instruction is used to instruct whether to switch a core network. For example, one bit may be used as the network switching instruction. 1 instructs to switch a core network, and 0 instructs not to switch a core network. Alternatively, 0 instructs to switch a core network, and 1 instructs not to switch a core network.

The target core network identifier is used to indicate the core network type of the target core network of redirection. For example, one bit may be used as the target core network identifier. 1 represents a 5G core network NGCN, and 0 represents a 4G core network EPC. Alternatively, 0 represents a 5G core network NGCN, and 1 represents a 4G core network EPC.

It should be noted that the functions of the mobility management device in the embodiment corresponding to FIG. 3 may be implemented by the mobility management device provided in this embodiment. For detailed descriptions, refer to related content in the embodiment corresponding to FIG. 3. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present invention, it should be understood that the disclosed system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware functional unit and a software functional unit.

Finally, it should be noted that the above embodiments are merely provided for describing the technical solutions of the present invention, but are not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A network redirection method comprising:
    receiving, by a terminal, network switching instruction information that is used for redirection and that is sent by an access network device;
    obtaining, by the terminal, a core network type of a target core network of redirection indicated by a target core network identifier carried in the network switching instruction information; and
    accessing, by the terminal, the target core network based on the core network type,
    wherein receiving, by a terminal, network switching instruction information that is used for redirection and that is sent by an access network device comprises:
    receiving, by the terminal, a radio resource control (RRC) connection release message sent by the access network device, wherein the RRC connection release message carries the network switching instruction information, and the network switching instruction information is carried by a release cause information element (IE) in the RRC connection release message.

2. The method of claim 1, wherein accessing, by the terminal, the target core network based on the core network type comprises:
    sending, by the terminal, core network type indication information used to indicate the core network type of the target core network to a target access network device of redirection, to enable the terminal to access the target core network through the target access network device.

3. The method of claim 2, wherein sending, by the terminal, core network type indication information used to indicate the core network type of the target core network to a target access network device of redirection comprises:
    sending, by the terminal, a radio resource control (RRC) connection request message to the target access network device, wherein the RRC connection request message carries the core network type indication information.

4. The method of claim 2, wherein the core network type indication information comprises a non-access stratum (NAS) capability.

5. The method of claim 1, wherein the network switching instruction information comprises a network switching instruction that is used to instruct whether to switch a core network.

6. A terminal device comprising:
    a communications interface;
    a memory configured to store computer-executable instructions; and
    one or more processors in communication with the communications interface and the memory and configured to execute the computer-executable instructions to at least:
    receive, by the communications interface, network switching instruction information that is used for redirection and that is sent by an access network device;
    obtain a core network type of a target core network of redirection indicated by a target core network identifier carried in the network switching instruction information; and
    access, by the communications interface, the target core network based on the core network type,
    receive, by the communications interface, a radio resource control (RRC) connection release message sent by the access network device, wherein the RRC connection release message carries the network switching instruction information, and the network switching instruction information is carried by a release cause information element (IE) in the RRC connection release message.

7. The terminal device of claim 6, wherein the computer executable instructions, when executed, further cause the one or more processors to:

send, by the communications interface, core network type indication information used to indicate the core network type of the target core network to a target access network device of redirection, to enable the terminal device to access the target core network through the target access network device.

8. The terminal device of claim 7, wherein the computer-executable instructions, when executed, further cause the one or more processors to:

send, by the communications interface, a radio resource control (RRC) connection request message to the target access network device, wherein the RRC connection request message carries the core network type indication information.

9. The terminal device of claim 8, wherein the core network type indication information comprises a non-access stratum (NAS) capability.

10. The terminal device of claim 6, wherein the network switching instruction information comprises a network switching instruction that is used to instruct whether to switch a core network.

11. A network redirection method comprising:

sending, by an access network device, network switching instruction information that is used for redirection to a terminal, to enable the terminal to obtain a core network type of a target core network of redirection indicated by a target core network identifier carried in the network switching instruction information and access the target core network based on the core network type, wherein before sending, by an access network device, network switching instruction information that is used for redirection to a terminal, the method further comprises:

receiving, by the access network device, network switching request information that is used for network switching and that is sent by a mobility management device, wherein the network switching request information comprises the target core network identifier, wherein sending, by an access network device, network switching instruction information that is used for redirection to a terminal comprises:

sending, by the access network device, a radio resource control (RRC) connection release message to the terminal, wherein the RRC connection release message carries the network switching instruction information, and the network switching instruction information is carried by a release cause information element (IE) in the RRC connection release message.

12. The method of claim 11, wherein the network switching request information is used for voice fallback of a voice service or an emergency service.

13. The method of claim 11, wherein the network switching request information comprises a network switching instruction that is used to instruct whether to switch a core network.

14. The method of claim 11, wherein receiving, by the access network device, network switching request information that is used for network switching and that is sent by a mobility management device comprises:

receiving, by the access network device, an N2 request message or a UE context modification request message sent by the mobility management device, wherein the N2 request message or the UE context modification request message carries the network switching request information.

15. The method of claim 11, wherein the network switching instruction information comprises a network switching instruction that is used to instruct whether to switch a core network.

16. The method of claim 1, wherein the network switching request information is used for voice fallback of a voice service or an emergency service.

* * * * *